(12) United States Patent
Ehrmann

(10) Patent No.: US 9,188,208 B2
(45) Date of Patent: Nov. 17, 2015

(54) LIFTING DEVICE FOR A PACKAGING MACHINE

(71) Applicant: Multivac Sepp Haggenmüller GmbH & Co. KG, Wolfertschwenden (DE)

(72) Inventor: Elmar Ehrmann, Bad Groenenbach (DE)

(73) Assignee: MULTIVAC SEPP HAGGENMUELLER GMBH & CO. KG, Wolfertschwenden (DE)

( * ) Notice: Subject to any disclaimer, the term of this patent is extended or adjusted under 35 U.S.C. 154(b) by 140 days.

(21) Appl. No.: 13/900,686

(22) Filed: May 23, 2013

(65) Prior Publication Data

US 2013/0312551 A1     Nov. 28, 2013

(30) Foreign Application Priority Data

May 24, 2012   (EP) ..................... 12004048

(51) Int. Cl.
*B66F 3/12*     (2006.01)
*F16H 21/22*    (2006.01)
*B65B 51/14*    (2006.01)
*B65B 65/02*    (2006.01)
*B29C 65/00*    (2006.01)
*B29C 51/38*    (2006.01)
*B26D 5/02*     (2006.01)

(52) U.S. Cl.
CPC ................ *F16H 21/22* (2013.01); *B65B 51/14* (2013.01); *B65B 65/02* (2013.01); *B66F 3/12* (2013.01); *B26D 5/02* (2013.01); *B29C 51/38* (2013.01); *B29C 66/8225* (2013.01); *B29C 66/8322* (2013.01); *B29C 66/849* (2013.01); *Y10T 74/18208* (2015.01)

(58) Field of Classification Search
CPC ........................................................ B66F 3/12
USPC ............ 254/1, 8 R, 9 R, 9 B, 9 C, 10 R, 10 C
See application file for complete search history.

(56) References Cited

U.S. PATENT DOCUMENTS

| | | | |
|---|---|---|---|
| 6,200,122 | B1 | 3/2001 | Chun et al. |
| 2007/0135285 | A1 | 6/2007 | Schiebout et al. |

FOREIGN PATENT DOCUMENTS

| | | |
|---|---|---|
| DE | 4216210 A1 | 11/1993 |
| DE | 10327092 A1 | 12/2004 |
| DE | 102006006218 A1 | 8/2007 |
| DE | 102007026727 A1 | 12/2007 |
| DE | 102008034971 A1 | 1/2010 |
| DE | 102009008452 B3 | 10/2010 |
| DE | 102010013889 A1 | 10/2011 |
| EP | 1832408 A2 | 9/2007 |

*Primary Examiner* — Lee D Wilson
*Assistant Examiner* — Jamal Daniel
(74) *Attorney, Agent, or Firm* — Husch Blackwell LLP

(57) ABSTRACT

The invention relates to a lifting device for a work station of a packaging machine, the lifting device comprising two drive shafts, which are arranged in parallel and which each have arranged thereon at least two toggle levers for vertically moving in common a tool lower part. The drive shafts each have a servomotor as a drive unit and the servomotors are synchronized with each other.

11 Claims, 3 Drawing Sheets

LIFTING DEVICE FOR A PACKAGING MACHINE

CROSS-REFERENCE TO RELATED APPLICATIONS

This Application claims priority to European Application Number 12004048.0 filed May 24, 2012, to Elmar Ehrmann entitled "Lifting Device for a Packaging Machine," currently pending, the entire disclosure of which is incorporated herein by reference.

FIELD OF THE INVENTION

The invention relates to a lifting device for a work station of a packaging machine.

BACKGROUND OF THE INVENTION

DE 4216210 discloses a pneumatically driven lifting unit for a forming or sealing station of a thermoform packaging machine. In addition, DE 10 2006 006 218 A1 discloses a lifting unit, which is also operated pneumatically. In the case of this lifting unit, the movement of the cylinder piston is converted by means of a plurality of lever mechanisms into a vertical movement of a tool lower part and a tool upper part with shafts, some of which rotate in opposite directions. The synchronization of the shafts rotating in opposite directions is complicated and, due to the lever mechanisms, the lifting unit is difficult to clean.

Other lifting units for packaging machines are disclosed by DE 10 2009 008 452 A1 and DE 10 2010 013 889 A1.

SUMMARY OF THE INVENTION

It is the object of the present invention to provide an improved lifting unit for a packaging machine.

The lifting unit for a work station of a packaging machine according to one embodiment of the present invention comprises two drive shafts, which are arranged in parallel and which each have arranged thereon at least two toggle lever systems for vertically moving in common a tool lower part. The drive shafts can each have a servomotor as a drive unit and the servomotors can be synchronized with each other. It is thus possible to move a tool lower part vertically with only two respective toggle levers systems, each including two levers. This arrangement is easy to clean in view of the small number of parts comprised therein. The servomotors are additionally advantageous insofar as, for example, in the case of an embodiment including three toggle lever systems on one drive shaft, it will suffice to provide larger servomotors at the shaft end when the tool lower part has larger dimensions. Synchronization can be accomplished mechanically by coupling the two drive shafts, for example, by means of a toothed belt connection, or electrically by controlling the two servomotors simultaneously and with the same motion profile.

In one embodiment, the drive shafts rotate in opposite directions of rotation so as to reduce tilting and shearing forces acting on guide units, or to avoid such forces completely. If the drive shafts are mechanically coupled by means of a toothed belt connection, rotation in the same direction is an advantageous variant.

A referencing position may be provided, at which the two servomotors are cyclically synchronized with respect to each other so as to guarantee a synchronized rotation of the drive shafts and of the toggle levers when the lifting device is in operation.

The referencing position can be defined by a first stop at a lowermost position of the tool lower part. According to one embodiment, the referencing position is detectable by monitoring the motor current of the servomotors, when the drive shafts rotatingly move against the first stop at which the drive shafts are blocked.

In one embodiment, the stop provided is a cam profile. This allows the cam profile to have also a second stop for a dead center position of the toggle levers.

The cam profile can be implemented statically relative to the frame, preferably attached to the frame such that it is secured against rotation relative thereto, whereby a mechanically simple and simultaneously stable structural design is obtained.

One embodiment is so conceived that a coupling to a tool upper part is provided, so that an optional upper stroke movement of the tool upper part can be provided, without an additional actuator being necessary.

The tool lower part and the tool upper part have here opposite directions of movement according to an expedient embodiment.

Preferably, two diagonally arranged guide units are provided, since the drive shafts, which rotate in opposite directions and in synchronism with one another, already execute with a total of four toggle levers a linear and/or vertical movement of the tools and since the forces that have to be taken up by the guide units are therefore only small.

Brakes can be provided on the drive shafts or the motors so that the tools can reliably be retained at any position.

According to one embodiment, measuring devices for detecting an angle of rotation in the motor or at the drive shafts are additionally provided so as to guarantee a synchronous rotation of the drive shafts.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are provided with identical reference numerals throughout the figures.

DETAILED DESCRIPTION OF THE INVENTION

Figure 1:
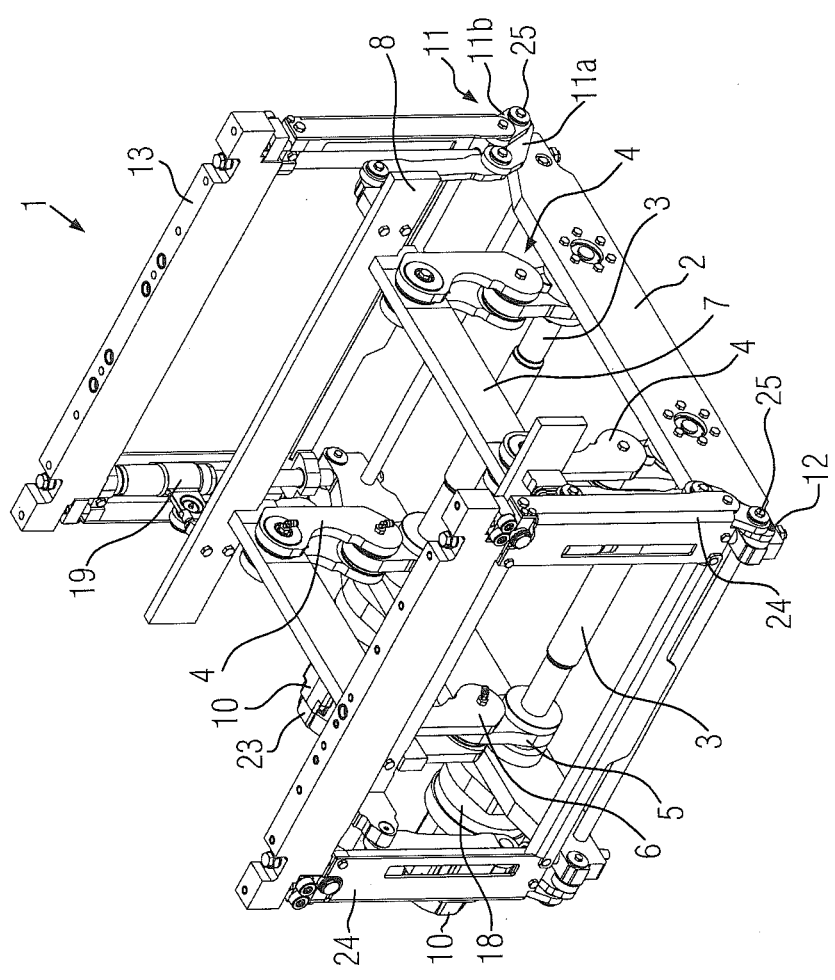
FIG. 1 is a top perspective view of lifting device according to one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a lifting device 1 including a frame 2 via which the lifting device 1 is mounted in a packaging machine in the machine frame thereof. Two drive shafts 3 are arranged and supported parallel to one another in said frame 2. Each drive shaft 3 may have provided thereon, within the frame 2, two toggle levers 4 comprising a lever 5 and a pair of levers 6. The toggle levers 4 can be connected to cross members 7 having, in turn, attached thereto a first tool holder 8 for a tool lower part 9 (cf. FIG. 2). The first tool holder 8 is vertically guided on two guide units 19 arranged on diagonally opposed corners of the lifting device 1. On one side of the frame 2, the drive shafts 3 may have attached thereto servomotors 10 which drive the drive shafts 3 in opposite directions and in synchronism.

The first tool holder 8 can have attached thereto mechanical couplings 11, which are connected to a second tool holder 13 used for holding a tool upper part 14 (cf. FIG. 2), so as to execute an upper stroke of the tool upper part 14. An upward movement of the first tool holder 8 causes, by means of the mechanical couplings 11, a downward, oppositely directed movement of the second tool holder 13. In the course of these movements, the tool lower part 9 and the tool upper part 14 approach each other until they finally may come into contact with each other thus pinching (clamping) a film web 15. The servomotors 10 can have brakes 18 for holding the lifting device 1 at this operating position.

In one embodiment, the lifting device 1 is secured in position in the machine frame 26 (cf. FIG. 2) via holders 24 such that, when the tool lower part 9 moves upwards, a first lever 11a moves about a fulcrum 12 in the frame 2. The frame 2, which is coupled via a second lever 11b to the holder 24, is simultaneously moved downwards and, consequently, also the tool upper part 14 and the tool holder 13 are moved downwards towards the tool lower part 9. When the lifting device 1 is opened, the reverse happens. The second lever 11b is here rotatable about a pivoting axis 25 in the first lever 11a.

Figure 2:
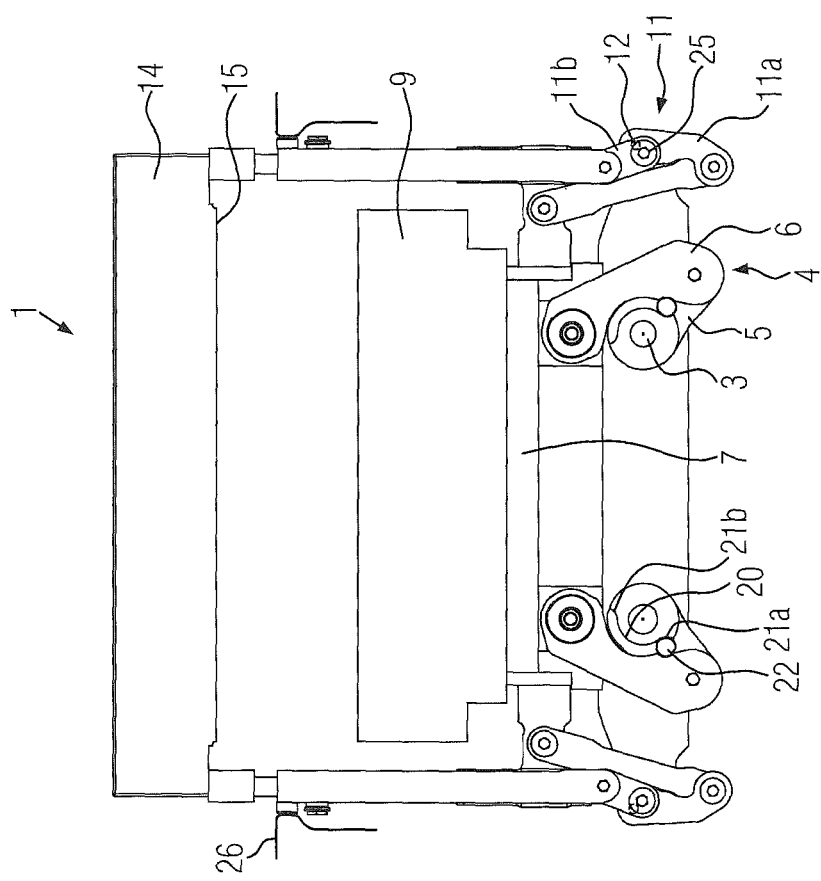
FIG. 2 is a side view of the lifting device comprising a tool lower part and a tool upper part at an open position according to one embodiment of the present invention.

The lifting device 1, the tool lower part 9 and the tool upper part 14 can define together the work station of the packaging machine, for example, a forming station, sealing station or cutting station FIG. 2 shows a lifting device 1 at an open position at which the drive shafts 3 turned the respective toggle levers 4 outwards and the tool lower part 9 occupies its lowermost position. Mechanical stops 21a, 21b can be provided for both drive shafts 3, said stops 21a, 21b defining referencing positions so that the servomotors 10 can be referenced at the beginning of and also during the operation of the lifting device 1. As shown, the frame 2 has attached thereto cam profiles 20 for each shaft 3, said cam profiles 20 including a first stop 21a for the referencing position and a second stop 21b for a work position, at which the toggle levers 4 are at a dead center position. At the dead center position, the toggle levers 4 are at their position of maximum extension, i.e., the lever 5 and the pair of levers 6 are vertically aligned (cf. FIG. 3). The stops 21a, 21b may limit the movement of the lever 5 by means of a respective pin 22 attached to the lever 5. For referencing both servomotors 10 at the referencing position, both said servomotors 10 can rotate in a test running mode the shaft 3 until the respective pins 22 come into contact with the first stop 21a and block the rotation. At this position, referencing of both servomotors 10 takes place so as to allow a subsequent synchronized movement of both shafts 3, so that the tool lower part 9 can be lifted vertically without tilting. This referencing process may take place cyclically, preferably whenever the packaging machine is switched on.

Figure 3:
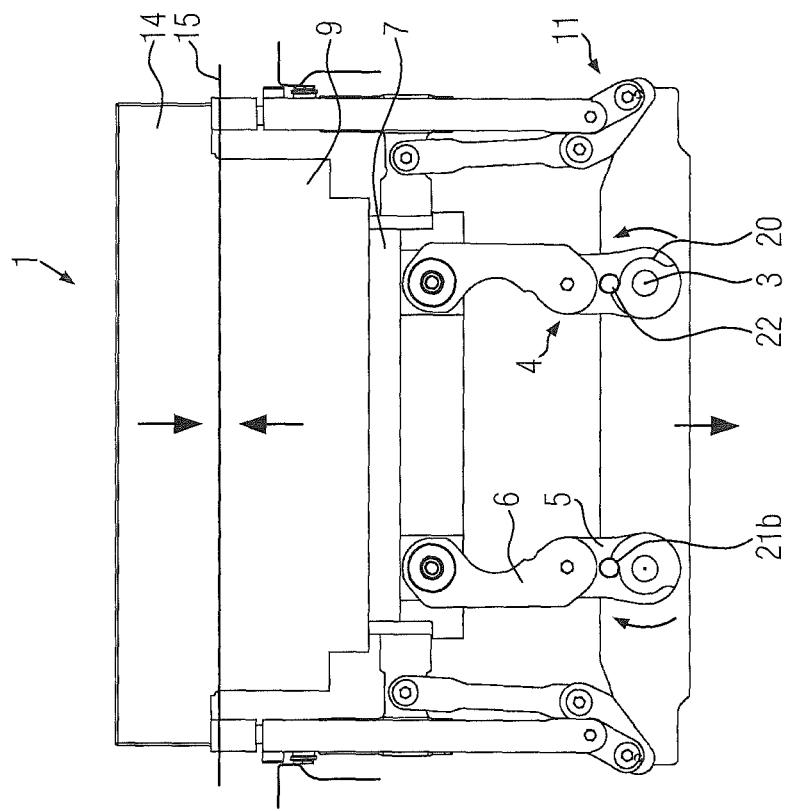
FIG. 3 is a side view of the lifting device shown in FIG. 2, at a closed position.

FIG. 3 shows the lifting device 1 at a closed position, which is also its operating position. At this position the film/foil 15 is pinched (clamped) between the tool upper part 14 and the tool lower part 9, for example, for forming troughs in the film 15. For moving the tools 9, 14 to this position, the servomotors 10 rotate the drive shafts 3 in opposite directions, i.e., the right drive shaft 3 rotates counterclockwise and the left drive shaft 3 rotates clockwise. When this rotation takes place, the toggle levers 4 lift the cross members 7 linearly upwards until the toggle levers 4 arrive at the dead center. The cam profile 20 is configured such that, at this position, the pin 22 comes into contact with the stop 21b and blocks any further rotation. The detection of this position and thus of the maximum stroke and/or of the maximum possible rotation of the shafts 3 between the stops 21a, 21b is carried out by means of a test run. The servomotors 10 may rotate the shafts 3 and consequently the levers 5 and the pins 22 with reduced power until the end position, at which rotation of the shafts 3 is blocked at the stops 21b, has been reached. Subsequently, the whole length of stroke and the range of rotation are known, since the servomotors 10 include integrated measuring devices 23, preferably incremental or absolute rotary encoders, for detecting an angle of rotation. Via a machine control of the packaging machine, the tool lower part 9 can be positioned at any position between the stops 21a, 21b and between the referencing position and the closed position, respectively.

Also alternative embodiments are imaginable, in which the cam profile 20 is replaced by respective mechanically adjustable, separate stops 21a, 21b. Measuring devices 23, such as rotary encoders, may not be integrated in the motor 10 but attached to the shafts 3 in an alternative embodiment. In addition, the lifting device 1 may include three, four or more guide units 19. The servomotors 10 may have gear mechanisms so that a precise rotary motion can be executed and a high torque provided. In another modified embodiment, an upper stroke, i.e., a stroke of the tool upper part 14, may be dispensed with. In this case no coupling 11 would have to be provided.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A lifting device for a work station of a packaging machine, said lifting device comprising two drive shafts which are arranged in parallel in a frame and which each have arranged thereon at least two toggle levers for vertically moving in common a tool lower part, wherein the drive shafts each have a servomotor as a drive unit, the servomotors are synchronized with each other, and the servomotors are coupled directly to the drive shafts on one side of the frame, the servomotors driving the drive shafts to rotate the drive shafts in opposite directions of rotation.

2. A lifting device according to claim 1 further comprising a referencing position at which the servomotors are cyclically synchronized with respect to each other.

3. A lifting device according to claim 2, wherein the referencing position is defined by a first stop at a lowermost position of the tool lower part, and the first stop is attached to the frame.

4. A lifting device according to claim 3, wherein an arrival of the servomotors at the referencing position can be detected by means of motor current monitoring of the servomotors.

5. A lifting device according to claim 3, wherein the first stop is provided as part of a cam profile.

6. A lifting device according to claim 5, wherein the cam profile also includes a second stop for a dead center position of the toggle levers.

7. A lifting device according to claim 5, wherein the cam profile is statically attached to the frame such that it is secured against rotation relative thereto.

8. A lifting device according to one claim 1 further comprising a coupling configured for causing oppositely directed movements of the tool lower part and a tool upper part.

9. A lifting device according to claim 1 further comprising at least two guide units provided at diagonally opposed corners of the lifting device.

10. A lifting device according to claim 1 further comprising brakes on the drive shafts or at the servomotors.

11. A lifting device according to claim 1 further comprising measuring devices for detecting angles of rotation in the servomotors or at the drive shafts.

* * * * *